Sept. 8, 1925.

J. W. SAFFOLD

DIGGER IMPLEMENT

Filed July 6, 1923

1,553,270

Inventor

James Webb Saffold

Patented Sept. 8, 1925.

1,553,270

UNITED STATES PATENT OFFICE.

JAMES WEBB SAFFOLD, OF CLEVELAND, OHIO.

DIGGER IMPLEMENT.

Application filed July 6, 1923. Serial No. 649,811.

*To all whom it may concern:*

Be it known that I, JAMES WEBB SAFFOLD, a citizen of the United States, residing at Cleveland, in the county of Cuyahoga and State of Ohio, have invented certain new and useful Improvements in Digger Implements, of which the following is a specification.

My invention relates to improvements in digger implements, the present embodiment of the invention being particularly designed and adapted for use in the removal of noxious weeds or plants from lawns, gardens, and the like.

The improved tool or implement is adapted not only to deeply penetrate the soil about the weed or plant but to excavate or remove the surrounding soil, together with the root of the plant or weed and yet without leaving any objectionable cavity at the place removed.

The primary object of the invention is to provide a generally improved implement of the type or class indicated which will be exceedingly simple in construction, cheap of manufacture and efficient in use.

A further object is the provision of a tool of this class admirably adapted to the quick and complete removal of deeply rooted weeds or plants as well as one which may be readily adjusted with respect to the earth penetrating prongs or blades to meet the varying soil and plant conditions.

With the above mentioned and other ends in view, the invention consists in the novel construction, arrangement and combination of parts, hereinafter described, illustrated in one of its embodiments in the accompanying drawings and particularly pointed out in the appended claims.

Figure 1:
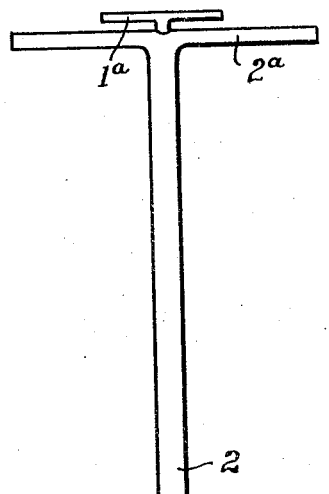

Referring to the drawings, forming a part of this specification, Figure 1 is a side elevation of a tool, constructed in accordance with this invention, the parts being shown in their retracted or initial position preparatory to penetrating the soil for engaging and removing a plant therefrom.

Figure 2:
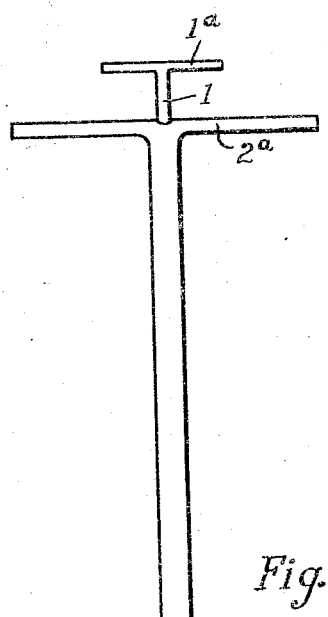

Fig. 2, a similar view showing the parts in their opposite or reversed position preparatory to lifting and removing a plant.

Figure 3:
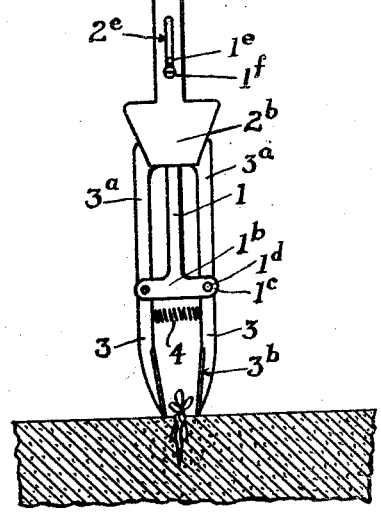

Fig. 3, a cross sectional view taken on line 3—3 of Fig. 2.

Similar numerals of reference designate like parts throughout all the figures of the drawings.

In general terms, the improved implement may be said to comprise relatively movable handles, one of which is provided with movable earth penetrating jaws or prongs operatively connected to and actuated by the other.

The improved tool or implement comprises a relatively fixed handle 1, and a relatively movable handle 2. As a convenient means of mounting and operating the handles 1 and 2, the handle 1 is preferably in the specific form of a bar or shaft and the handle 2 in the specific form of a surrounding tube or sleeve.

As a convenient means of mounting and operating the earth penetrating jaws or prongs, hereinafter referred to, and through the movements of the members 1 and 2, the handle 2 preferably terminates at its top in a cross bar 2$^a$ and the relatively fixed handle or bar 1 in a handle cross bar 1$^a$.

As a convenient means of mounting or attaching the earth penetrating jaws or prongs 3, upon the member 1, the latter is provided at its lower end with a bearing head 1$^b$, said bearing head 1$^b$, in the present instance, being in the specific form of a cross head or bar, said bearing bar or head 1$^b$ preferably terminating in spaced bearing lugs 1$^c$, adapted to receive and carry the pivoted portion of the jaws. Suitable bearing elements or bolts 1$^d$ are adapted to removably secure the jaws or prongs in position and as a convenient means of actuating the latter the jaws are preferably extended in the form of actuating arms or levers 3$^a$. The jaws or prongs 3 may be of any suitable and convenient form and are preferably tapered and pointed, as indicated. If desired, the jaws may be provided with separate blades 3$^b$, or such jaws may be formed to provide integral cutting and excavating points.

As a convenient means of actuating the jaws or prongs through the levers 3$^a$, the relatively movable handle or sleeve 2 may be provided with a jaw actuating and guiding head 2$^b$. In the present instance the head 2$^b$ is provided with inclined or wedge shaped sides 2$^c$, to coact with the inner sides of the jaw levers or arms 3$^a$.

As a convenient means of preventing relative displacement between the head 2$^b$ and the arms or levers 3$^a$,—particularly where the tool is given a twisting movement, the sides 2$^c$ of the head are preferably provided with guide grooves or ways 2ᵈ within which the contacting portions of the arms are adapted to slide as the relatively movable handle 2 is reciprocated.

As a means of limiting the relative reciprocatory movement between the handles 1 and 2 and particularly of changing the stopping positions of the head 2ᵇ relative to the pivoted portions of the jaws and correspondingly changing the relative positions of the jaws when opened or closed, the handle 1 may be provided with a series of threaded openings 1ᵉ, adapted to removably receive and contain a stop element or screw 1ᶠ, adapted to operate in a guide slot 2ᵉ of the tubular handle or sleeve 2. It will be obvious that by changing the position of the stop element 1ᶠ in the openings 1ᵉ the length of the stroke of the parts and of their relative positions will be correspondingly changed.

As a means of returning the jaws to their initial positions when the movable or plunger handle 2 is retracted, as shown in Fig. 1 of the drawings, a coiled expansion spring 4 may be inserted between the jaws, as shown, it being obvious that the position of the spring may be changed and likewise the character thereof so long as the same acts to return the jaws to their original positions when the parts are retracted.

When used as a digger implement the parts are moved to the position shown in Fig. 1 of the drawings and pressure is placed upon the cross bar 2ᵃ, moving the handle 2 and jaw actuating and guiding head 2ᵇ downwardly and relatively of the handle 1 to the position shown in Fig. 2 of the drawings, whereupon the plant and the surrounding soil may be removed by holding the handles 1ᵃ and 2ᵃ in the position shown, or lifting up solely by the handle 1ᵃ, it being obvious that a reverse movement of the handles 1ᵃ and 2ᵃ will restore the parts to their initial position thereby discharging the plant, or if desired, the latter may be held in engaged position substantially as shown in Fig. 2 and reinserted in the soil (as in transplanting) and then moving the parts relatively from the position shown in Fig. 2 to the position shown in Fig. 1 and withdrawing the implement, leaving the plant in the soil.

While for the purpose of illustration and clearness of explanation I have shown two oppositely arranged earth penetrating jaws or prongs it will, of course, be obvious that the principles of this invention may be readily embodied in a tool embodying three or more jaws or prongs.

Having thus described one of the embodiments of my invention, without having attempted to set forth all the forms in which it may be made, or all the modes of its use, what I claim and desire to secure by Letters Patent is,—

1. A plant digger, comprising plunger handles guided on each other, one of said handles having a cross head carrying pivoted longitudinally extending earth penetrating lever jaws and the other being in the form of a surrounding tube having a lever jaw actuating and guiding head closing said lever jaws when moved toward the pivoted portion thereof and opening the same when moved in a reverse direction.

2. In a plant digger including a handle bar provided at one end with longitudinally extending pivoted jaws and lever arms, a handle sleeve on said handle bar provided with a bearing head having inclined guide portions slidably connected to and operating said lever arms as reciprocated and adjustable means for limiting the movements of said handle sleeve and regulating the opening and closing movements of said jaws through said lever arms.

3. A digger implement, comprising a handle bar carrying a pair of pivoted longitudinally extending radially movable lever jaws at one end and an operating cross handle at the other, and a plunger handle sleeve on said handle bar terminating in a head having oppositely arranged inclined guides engaging and operating said lever jaws with the relative movement thereof, said handle sleeve terminating in a cross handle in close proximity to said cross handle of said handle bar.

4. In a plant digger, a handle shaft terminating at one end in a bearing head and at the other in a cross bar, digger jaws pivoted on said bearing head and provided with lever arms extending at the sides of said handle shaft, a handle sleeve on said handle bar provided with a guide head having guides interposed between and adapted to actuate said lever arms of said jaws as reciprocated, and means between said handle bar and handle sleeve for limiting the movements thereof.

5. In a plant digger, a handle shaft terminating at one end in a bearing head and at the other in a cross bar, digger jaws pivoted on said bearing head and projecting in front of the latter, said jaws being provided with lever arms extending along said handle shaft, a tubular handle slidable on said handle bar and provided with a guide head having guides having a slidable inclined connection between and actuating said arms of said jaws as reciprocated.

In testimony whereof I have affixed my signature.

JAMES WEBB SAFFOLD.